(12) United States Patent
Thomas et al.

(10) Patent No.: US 7,247,675 B2
(45) Date of Patent: Jul. 24, 2007

(54) ELASTOMER COMPOSITIONS AND METHOD OF MAKING THEM

(75) Inventors: Oomman Painummoottil Thomas, Alpharetta, GA (US); Vasily Aramovich Topolkaraev, Appleton, WI (US); Glen Thomas Mildenhall, Marietta, GA (US); Tamara Lee Mace, Doraville, GA (US); Hristo Angelov Hristov, Roswell, GA (US); Dennis Lloyd Hasha, Woodstock, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 150 days.

(21) Appl. No.: 10/749,148

(22) Filed: Dec. 30, 2003

(65) Prior Publication Data

US 2005/0148732 A1 Jul. 7, 2005

(51) Int. Cl.
*C08L 9/00* (2006.01)
(52) U.S. Cl. ............................ 525/98; 525/71; 428/526
(58) Field of Classification Search ................. 525/69, 525/71, 902, 98; 428/516, 526
See application file for complete search history.

(56) References Cited

U.S. PATENT DOCUMENTS

| | | |
|---|---|---|
| 3,856,278 A | 12/1974 | Eisenmann |
| 3,932,086 A | 1/1976 | Kasamatsu |
| 4,409,167 A | 10/1983 | Kolouch et al. |
| 4,599,002 A | 7/1986 | Gutknecht |
| 4,607,797 A | 8/1986 | Enikolopow et al. |
| 4,808,474 A * | 2/1989 | Sipinen ..................... 428/343 |
| 4,871,799 A | 10/1989 | Kobayashi et al. |
| 5,240,983 A | 8/1993 | Tabata et al. |
| 5,369,149 A | 11/1994 | Unger |
| 5,378,760 A | 1/1995 | Modic et al. |
| 5,382,633 A | 1/1995 | Scott et al. |
| 5,395,055 A | 3/1995 | Shutov et al. |
| 5,397,065 A | 3/1995 | Shutov et al. |
| 5,461,111 A | 10/1995 | Modic et al. |
| 5,523,372 A | 6/1996 | Fisk |
| 5,697,390 A | 12/1997 | Garrison et al. |
| 5,704,555 A | 1/1998 | Arastoopour |
| 5,743,471 A | 4/1998 | Ivanov |
| 5,769,335 A | 6/1998 | Shutov |
| 5,904,885 A | 5/1999 | Arastoopour et al. |
| 5,958,988 A | 9/1999 | Matsushita et al. |
| 6,066,367 A | 5/2000 | Nishibori |
| 6,127,434 A | 10/2000 | Triboulet et al. |
| 6,180,685 B1 | 1/2001 | Khait |
| 6,255,387 B1 | 7/2001 | Olivier et al. |
| 6,344,187 B1 | 2/2002 | Le Bras-Roulier et al. |
| 6,361,734 B1 | 3/2002 | Miki |
| 6,399,709 B1 | 6/2002 | Moriguchi et al. |
| 6,403,710 B1 * | 6/2002 | Ahmed et al. ................. 525/98 |
| 6,479,003 B1 | 11/2002 | Furgiuele et al. |
| 6,479,154 B1 * | 11/2002 | Walton et al. ........... 428/424.4 |
| 6,579,937 B1 | 6/2003 | Güntherberg et al. |
| 6,750,288 B2 * | 6/2004 | Pradel ........................ 525/100 |
| 2002/0061982 A1 | 5/2002 | Donald et al. |
| 2002/0115749 A1 | 8/2002 | Khait |
| 2002/0193517 A1 | 12/2002 | Wang et al. |
| 2003/0030169 A1 | 2/2003 | Koike et al. |
| 2003/0060566 A1 | 3/2003 | Hattori et al. |
| 2004/0122409 A1 | 6/2004 | Thomas et al. |

FOREIGN PATENT DOCUMENTS

| | | |
|---|---|---|
| EP | 0 449 086 A1 | 10/1991 |
| EP | 0 596 835 A1 | 5/1994 |
| EP | 0 733 675 A1 | 9/1996 |
| EP | 0 791 631 A1 | 8/1997 |
| EP | 1 004 416 | 5/2000 |
| FR | 2 672 298 | 10/1986 |
| JP | 04-139202 A2 | 5/1992 |
| JP | 09-031204 A2 | 2/1997 |
| JP | 10-046037 A2 | 2/1998 |
| JP | 11-035910 A2 | 2/1999 |
| WO | WO 95/15819 | 6/1995 |
| WO | WO 96/36470 | 11/1996 |
| WO | WO 96/36471 | 11/1996 |

* cited by examiner

*Primary Examiner*—James J. Seidleck
*Assistant Examiner*—Olga Asinovsky
(74) *Attorney, Agent, or Firm*—Pauley Petersen & Erickson

(57) ABSTRACT

Compositions of high and low performance elastomer are formed using a process that chemically reacts some of the high and low performance elastomers together to form a graft copolymer. The elastomeric compositions provide intimately mixed elastomeric compositions which are thermodynamically stable and do not phase separate. The elastomeric compositions exhibit a variety of improved properties compared to simple blends of the same high and low performance elastomers in the same weight proportions. The elastomeric compositions are useful for producing films, fabrics, and laminates for use in a wide variety of personal care and medical articles.

30 Claims, 1 Drawing Sheet

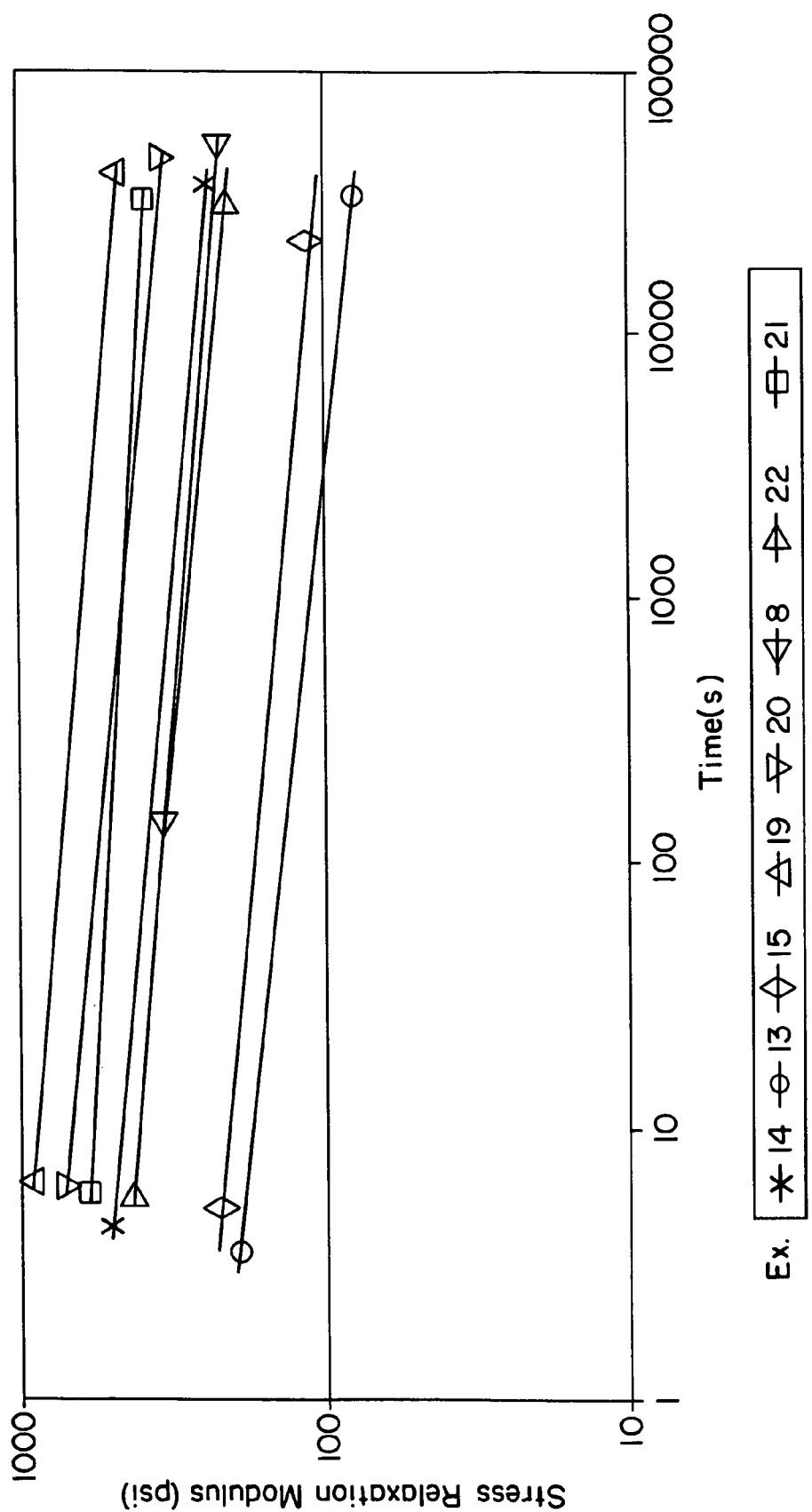

US 7,247,675 B2

ELASTOMER COMPOSITIONS AND METHOD OF MAKING THEM

FIELD OF THE INVENTION

This invention is directed to compositions of high performance and low performance elastomers, and to film and fabric layers formed using the elastomeric compositions.

BACKGROUND OF THE INVENTION

High performance thermoplastic elastomers are elastomers which, when formed into a film, strand or similar article, can be extended to a stretched length and retracted without experiencing a substantial loss in retractive force at an intermediate (lower) stretched length. While these elastomers typically have useful properties of high strength, low hysteresis, low creep and low stress relaxation, they are expensive relative to other elastomers and thermoplastic polymers in general.

Low performance thermoplastic elastomers are elastomers which, when formed into a film, strand or similar article, can be extended to a stretched length and retracted, but substantially lose their retractive force at an intermediate (lower) stretched length. While these elastomers are typically less expensive than high performance elastomers, they exhibit higher levels of hysteresis, creep and stress relaxation when stretched.

High and low performance elastomers have been blended together in various attempts to create blends which retain the performance characteristics of high performance elastomers to the extent possible, while saving on material costs. The blending has not resulted in elastomer blends having suitable hysteresis, creep, stress relaxation, or other properties. One reason for this is that the Gibb's free energy of mixing is positive, due to high interfacial tension between the molecules of high performance elastomer and low performance elastomer. The Gibb's free energy of mixing, or ΔG, is defined as the Gibb's free energy of the elastomer blend minus the sum of the Gibb's free energies of the components prior to blending, at a reference temperature.

When the Gibb's free energy of mixing is positive, thermodynamics favor phase separation over intimate mixing of the two elastic polymer components. Often, one of the components forms a continuous phase, while the other component forms a discontinuous phase of droplets or domains dispersed within the continuous phase. The phase separation adversely affects the elastic properties of the blend, and can result in melt instability during processing, and non-uniform gauge and physical appearance of the film or filament structure being produced. The tendency to phase separate diminishes as the Gibb's free energy of mixing approaches zero, and intimate mixing is favored when the Gibb's free energy of mixing is less than zero.

Accordingly, there is a need or desire for an elastic polymer composition including a high performance elastomer and a low performance elastomer, which combines the performance properties of the high performance elastomer with the cost benefits of the low performance elastomer. More specifically, there is a need or desire for an elastic polymer composition including a high performance elastomer and a low performance elastomer, which has a lower Gibb's free energy of mixing than a simple blend of the same high performance elastomer and the same low performance elastomer, in the same weight proportions, at ambient (storage) and elevated (mixing and processing) temperatures.

There is also a need or desire for film and fabric layers formed using such an improved elastic polymer composition.

SUMMARY OF THE INVENTION

The present invention is directed to an elastomer composition, including a high performance elastomer and a low performance elastomer, which has a lower Gibb's free energy of mixing and improved elastic performance characteristics compared to a simple blend of the same high performance elastomer and the same low performance elastomer, in the same weight proportions. The elastomer composition is formed by chemically reacting at least a small percentage of the high performance elastomer with at least a small percentage of the low performance elastomer to form graft copolymer molecules of high and low performance elastomer. The graft copolymer molecules are compatible with the remaining (non-grafted) polymer molecules of both the high performance elastomer and the low performance elastomer, and promote intimate mixing of the elastomer components. The invention is also directed to film and fabric layers formed using the elastomeric polymer composition.

The resulting elastomeric composition is thermodynamically stable, more intimately mixed, and the high and low performance elastomers are more compatible. The composition combines the performance characteristics of the high performance elastomer with the cost benefits of the low performance elastomer.

With the foregoing in mind, it is a feature and advantage of the invention to provide an improved elastomeric composition including a high performance elastomer and a low performance elastomer.

It is also a feature and advantage of the invention to provide film and fabric layers formed using the improved elastomeric composition.

DEFINITIONS

The terms "elastic" and "elastomeric" are used interchangeably to mean a material that is generally capable of recovering its shape after deformation when the deforming force is removed. Specifically, as used herein, elastic or elastomeric is meant to be that property of any material which upon application of a biasing force, permits the material to be stretchable to a stretched biased length which is at least about 50 percent greater than its relaxed unbiased length, and that will cause the material to recover at least 40 percent of its elongation upon release of the stretching elongating force after the first stretching cycle. A hypothetical example which would satisfy this definition of an elastomeric material would be a one (1) inch sample of a material which is elongatable to at least 1.50 inches and which, upon being elongated to 1.50 inches and released, will recover to a length of not more than 1.30 inches after the first stretching cycle. Many elastic materials may be stretched by much more than 50 percent of their relaxed length, and many will recover to substantially their original relaxed length upon release of the stretching, elongating force.

The term "recover" refers to a contraction of a stretched material upon termination of a biasing force following stretching of the material by application of the biasing force, as illustrated in the above example.

The term "percent stretch" refers to the ratio determined by measuring the increase in a dimension during stretching, dividing that value by the original dimension, and multiplying the result by 100:

$$\% \text{ stretch} = \frac{\text{(Stretched dimension minus original dimension)}}{\text{original dimension}} \times 100$$

The term "polymer" includes homopolymers, copolymers, such as for example, block, graft, random and alternating copolymers, terpolymers, etc., and blends and modifications thereof. The term "polymer" also includes all possible geometric configurations of the molecule. These configurations include, but are not limited to, isotactic, syndiotactic and random symmetries.

The term "blend" refers to a mixture of two or more polymers.

The term "high performance elastomer" refers to an elastomer having a hysteresis value of 25% or less, suitably 20% or less, determined according to the hysteresis test method described herein.

The term "low performance elastomer" refers to an elastomer having a hysteresis value of greater than 25%, suitably 40% or more, determined according to the hysteresis test method described herein.

The term "graft copolymer" as applied to high and low performance elastomers includes all di-block copolymers in which one of the blocks is a high performance elastomer molecule or molecular segment and the other of the blocks is a low performance elastomer molecule or molecular segment. The term includes a) copolymers in which a high performance elastomer molecule or molecular segment is chemically attached to a backbone of a low performance elastomer molecule or molecular segment, b) copolymers in which a low performance elastomer molecule or molecular segment is chemically attached to a backbone of a high performance elastomer molecule or molecular segment, and c) copolymers in which a high performance elastomer molecule or molecular segment and a low performance elastomer molecule or molecular segment are chemically joined end-to-end.

The term "Gibb's free energy," expressed as the symbol "G," is a thermodynamic expression of potential energy within a polymer system, represented by the equation:

$$G = H - TS$$

wherein H is the enthalpy of the polymer system,
T is the absolute temperature, and
S is the entropy in the polymer system.

Gibb's free energy and enthalpy can each be expressed in energy units (e.g., calories), energy per unit mass (e.g., calories/gram), or energy per mol (e.g., calories/mol). Entropy can be expressed in energy units per degree of temperature (e.g., calories/K), energy per unit mass per degree of temperature (e.g., calories/gram K), or energy per mol per degree of temperature (e.g., calories/mol-K).

The term "enthalpy," expressed as the symbol "H," is the sum of the total internal energy (U) of a polymer plus the product of its volume (V) and the absolute pressure (P), otherwise expressed as:

$$H = U + PV$$

Values of enthalpy for various substances are commonly found in tabulations of thermodynamic properties. Enthalpy values, and changes in enthalpy, can also be determined and calculated using known techniques.

The term "entropy," expressed as the symbol "S," is a measure of the extent of randomness within a polymer system. When randomness within a polymer system is caused or permitted to increase (for instance, when molecular orientations become more random), the entropy increases. When randomness within a polymer system is caused to decrease (for instance, when molecules become more oriented or aligned), the entropy decreases. Entropy, and changes in entropy, can be determined using known techniques.

BRIEF DESCRIPTION OF THE DRAWING

FIG. 1 is a log-log plot of stress relaxation modules versus time for the elastomer samples described in Examples 8, 13-15, and 19-22.

DETAILED DESCRIPTION OF THE PRESENTLY PREFERRED EMBODIMENTS

The present invention is directed to an elastomeric composition and to film and fabric layers formed from it. The composition includes a high performance elastomer, a low performance elastomer, and a graft copolymer of the high performance elastomer and low performance elastomer. The graft copolymer promotes intimate mixing and thermodynamic stability within the composition. The composition may include about 5-95% by weight of the high performance elastomer and about 5-95% by weight of the low performance elastomer, suitably about 20-80% by weight of the high performance elastomer and about 20-80% by weight of the low performance elastomer, particularly about 30-70% by weight of the high performance elastomer and about 30-70% by weight of the low performance elastomer. The composition may also include additional elastomeric or non-elastomeric polymers. When other polymers are present, the high performance elastomer and low performance elastomer should constitute at least about 50% by weight of the total polymer in the composition, suitably at least about 70% by weight, particularly at least about 90% by weight.

The high performance elastomer is one which exhibits a hysteresis value of 25% or less, suitably 20% or less, particularly 15% or less, or 10% or less, determined according to the hysteresis test method described herein. To perform the hysteresis test, the high performance elastomer by definition must have sufficient integrity and elasticity to form a stand-alone film having a thickness of 25 microns, which can be stretched by at least 100% of its initial length and permitted to recover. Suitable high performance elastomers include without limitation styrenic block copolymers, for example styrene-diene and styrene-olefin block copolymers sold under the trade name KRATON® by Kraton Polymers L.L.C.

Suitable styrene-diene block copolymers include di-block, tri-block, tetra-block and other block copolymers, and may include without limitation styrene-isoprene, styrene-butadiene, styrene-isoprene-styrene, styrene-butadiene-styrene, styrene-isoprene-styrene-isoprene, and styrene-butadiene-styrene-butadiene block copolymers. Suitable styrene-olefin block polymers include without limitation styrene-diene block copolymers in which the diene groups have been totally or partially selectively hydrogenated, including without limitation styrene-(ethylene-propylene), styrene-(ethylene-butylene), styrene-(ethylene-propylene)-styrene, styrene-(ethylene-butylene)-styrene, styrene-(ethylene-propylene)-styrene-(ethylene-propylene), and styrene-(ethylene-butylene)-styrene-(ethylene-butylene) block copolymers. In the above formulas, the term "styrene"

indicates a block sequence of styrene repeating units; the terms "isoprene" and "butadiene" indicate block sequences of diene units; the term "(ethylene-propylene)" indicates a block sequence of ethylene-propylene copolymer units, and the term "(ethylene-butylene)" indicates a block sequence of ethylene-butylene copolymer units. The styrene-diene or styrene-olefin block copolymer should have a styrene content of about 10 to about 50% by weight, suitably about 15 to about 25% by weight, and should have a number average molecular weight of at least about 40,000 grams/mol, suitably about 60,000 to about 110,000 grams/mol.

The low performance elastomer is one which exhibits a hysteresis value of more than 25%, suitably 40% or more, particularly about 50-75%, determined according to the hysteresis test method described herein. To perform the hysteresis test, the low performance elastomer by definition must have sufficient integrity and elasticity to form a stand-alone film having a thickness of 25 microns, which can be stretched by at least 100% of its initial length and permitted to recover. Suitable low performance elastomers include without limitation single-site catalyzed ethylene-alpha olefin copolymer resins having a density of about 0.915 grams/cm$^3$ or less, suitably about 0.860-0.900 grams/cm$^3$, particularly about 0.865-0.895 grams/cm$^3$. The term "single-site catalyzed" includes without limitation ethylene-alpha olefin copolymers formed using metallocene or constrained geometry catalysts. Examples of single-site catalysts include bis(n-butylcyclopentadienyl)titanium dichloride, bis(n-butylcyclopentadienyl)zirconium dichloride, bis(cyclopentadienyl)scandium chloride, bis(indenyl)zirconium dichloride, bis(methylcyclopentadienyl)titanium dichloride, bis(methylcyclopentadienyl)zirconium dichloride, cobaltocene, cyclopentadienyltitanium trichloride, ferrocene, hafnocene dichloride, isopropyl(cyclopentadienyl,-1-flourenyl)zirconium dichloride, molybdocene dichloride, nickelocene, niobocene dichloride, ruthenocene, titanocene dichloride, zirconocene chloride hydride, zirconocene dichloride, among others. A more exhaustive list of such compounds is included in U.S. Pat. No. 5,374,696 to Rosen et al. and assigned to the Dow Chemical Company. Such compounds are also discussed in U.S. Pat. No. 5,064,802 to Stevens et al. and also assigned to Dow. However, numerous other single-site catalyst systems are known in the art; see for example, U.S. Pat. No. 5,539,124 to Etherton et al.; U.S. Pat. No. 5,554,775 to Krishnamurti et al.; U.S. Pat. No. 5,451,450 to Erderly et al. and *The Encyclopedia of Chemical Technology*, Kirk-Othemer, Fourth Edition, vol. 17, Olefinic Polymers, pp. 765-767 (John Wiley & Sons 1996); the entire contents of the aforesaid patents being incorporated herein by reference.

The single-site catalyzed ethylene-alpha olefin copolymer may be formed using a $C_3$ to $C_{12}$ alpha-olefin comonomer, and is suitably formed using a butene, hexene or octene comonomer. The amount of the comonomer is normally between about 5-25% by weight of the copolymer, and may vary depending on how much comonomer is needed to achieve the desired density. Normally, higher comonomer amounts and/or larger comonomer molecules result in lower densities. The low performance elastomer may have a number average molecular weight of at least about 30,000 grams/mol, suitably about 50,000 to about 110,000 grams/mol, and may have a melt index of about 0.5-30 grams/10 min. at 190° C., suitably about 2-15 grams/10 min, measured using ASTM D-1238, Condition E. Suitable single-site catalyzed ethylene-alpha olefin copolymers are made and sold by the Dow Chemical Company under the trade names AFFINITY and ENGAGE, and by the Exxon-Mobil Chemical Co. under the trade names EXACT and EXCEED.

To form the elastomeric composition of the invention, portions of the high performance elastomer and low performance elastomer are graft copolymerized to form graft copolymers of a) high performance elastomer on a low performance elastomer backbone, b) low performance elastomer on a high performance elastomer backbone, and/or c) high and low performance elastomers joined end-to-end. The graft copolymerization may be accomplished by a variety of techniques.

One suitable graft copolymerization technique is solid state shear pulverization. The high and low performance elastomers are fed together or separately into one or more hoppers of a high torque twin screw extruder equipped with co-rotating screws. The co-rotating screws are fitted with kneading and shearing elements as well as conveying elements. The extruder includes a heating system, and a fluid cooling system or other means to remove excess heat generated due to friction. The high and low performance elastomers are mixed in the extruder under high shear, at a temperature that is below the melting or softening temperature of both elastomer polymers. Friction and heat are generated by the kneading and shearing elements in a portion of the extruder, causing chain scission ("visbreaking") of individual polymer molecules of high and low performance elastomer to form free radicals, and/or breaking of residual double bonds, obstruction of hydrogen atoms, or other compatible mechanisms. Cooling of the extruder subsequently causes the free radicals to re-combine. Some of the free radicals of high performance elastomer molecules combine with free radicals of low performance elastomer molecules to form graft copolymer molecules having chains of high and low performance elastomer. The resulting mixture of high performance elastomer, low performance elastomer and graft copolymer is then extruded as the elastomeric composition of the invention.

The graft copolymer molecules thus formed may constitute about 0.1 to about 10% of the combined weight of high performance elastomer, low performance elastomer and graft copolymer, suitably about 0.5 to about 7.5% of the combined weight, particularly about 1.0 to about 5.0% of the combined weight. The portions of the graft copolymer molecules that resemble the high performance elastomer are compatible with the remaining amount of unreacted high performance elastomer. The portions of the graft copolymer molecules that resemble the low performance elastomer are compatible with the remaining amount of unreacted low performance elastomer.

In one embodiment, the graft copolymer can be formed in a higher amount than stated above, resulting in a masterbatch or concentrate rich in the graft copolymer. The masterbatch or concentrate can then be diluted with additional amounts of high performance elastomer and/or low performance elastomer, to provide an elastomeric composition having a level of graft copolymer within the stated ranges, and/or a predetermined optimal level of graft copolymer.

In the resulting elastomer composition, the high and low performance elastomer and graft copolymer are intimately mixed together at their interfaces, compared to similar blends devoid of the graft copolymer. The elastomer composition has enough thermodynamic stability so that the components remain intimately mixed at their interfaces during subsequent processing and use. As a result, the elastomer composition of the invention forms films, fabrics and other articles which exhibit increased strength, improved elastic recovery, less hysteresis, less creep, and better stress relaxation, compared to a simple blend of the same high and low performance elastomers in the same weight proportions, devoid of the graft copolymer.

As indicated above, the Gibb's free energy of an elastomer or elastomer composition can be determined from the following equation:

$$G = H - TS$$

wherein

G is the Gibb's free energy, and can be expressed as calories,

H is the enthalpy, and can be expressed as calories,

T is the absolute temperature, and can be expressed as K, and

S is the entropy, and can be expressed as calories/K.

Whether or not an elastomeric composition exhibits thermodynamic stability depends not on the actual value of Gibb's free energy, but rather on the difference in Gibb's free energy between the elastomeric composition and the high and low performance elastomers prior to blending. Assuming a constant reference temperature, this difference in Gibb's free energy (i.e., the Gibb's free energy of mixing) can be expressed as:

$$\Delta G = \Delta H - T \Delta S$$

wherein $\Delta G$ is the change in Gibb's free energy of the elastomer composition relative to the total Gibb's free energy of the unblended components, at a reference temperature, $\Delta H$ is the change in enthalpy of the elastomer composition relative to the total enthalpy of the unblended components, at the reference temperature, T is the absolute reference temperature, and $\Delta S$ is the change in entropy of the elastomer composition relative to the total entropy of the components prior to blending.

Due to the presence of the compatibilizing graft copolymer molecules, the elastomer composition of the invention has a lower Gibb's free energy of mixing (a lower $\Delta G$) than a simple blend containing the same high and low performance elastomers in the same weight proportions and amounts. Suitably, the Gibb's free energy of mixing ($\Delta G$) is not more than about zero, and is suitably less than zero. When the Gibb's free energy of mixing ($\Delta G$) is about zero, the components will remain mixed to the extent they can be blended together, but will not exhibit any natural tendency toward intimate mixing or phase separation. When the Gibb's free energy of mixing ($\Delta G$) is less than zero, intimate mixing permits the elastomer molecules to transition from a higher energy state to a lower energy state, causing the release of heat. Thermodynamics favor intimate mixing over phase separation, and the components have a natural tendency to mix together and remain mixed. When describing the thermodynamics of the elastomeric composition of the invention, the term "components" includes not only the high and low performance elastomers, but also the graft copolymer(s) and (where applicable) any additional polymer ingredients. These relationships are true at reference temperatures of 300 K and 500 K, for the elastomer composition of the invention.

The shear pulverization useful to form the elastomeric composition of the invention can be performed using a suitable twin screw mixing/reaction extruder. Suitable twin screw extruders are available in various sizes from the Werner-Pfleiderer Corporation, Berstorff, and other companies. The twin screw extruders are equipped with heating and cooling capabilities in a plurality of zones located along the length of the extruder. The twin screws can also be equipped with various arrangements of conveying elements, kneading elements and shearing elements to provide an elastomeric composition with optimal properties. The temperature in the extruder may be individually controlled in the various zones, and may range from about 25 to about 250° C., suitably about 40 to about 150° C. Temperatures in the reaction (shear pulverization) zone are typically lower, between about 25-100° C., suitably about 40-90° C. Temperatures downstream from the mixing zone (approaching the die) may be higher to facilitate melting and mixing of the components. Internal pressures may range from about 50 to 150 atmospheres.

Other techniques may also be employed to form the elastomeric composition of the invention, including forming graft copolymer molecules from the high and low performance elastomers. For instance, visbreaking to form free radicals may also be accomplished thermally (with less shear) using higher temperatures within the extruder. Free radicals may also be generated at lower extruder temperatures with the aid of a peroxide catalyst. Free radicals can also be generated in solution with the aid of a peroxide catalyst. In each case, at least some of the free radicals re-combine to form the graft copolymer, while others may re-combine to form high or low performance elastomer molecules.

As explained above, other polymers may be added to or included in the elastomeric composition of the invention. Such other polymers include non-elastomeric polymers such as various polyethylenes, polypropylenes and other polyolefins, as well as elastic polymers that do not fall within the definitions of high and low performance elastomers provided herein. When present, the other polymers should constitute less than about .50% by weight of the elastomeric composition, suitably less than about 30% by weight, suitably less than about 10% by weight. The other polymers may be added to the elastomeric composition before or after the graft copolymerization process. If the other polymers are included in the graft copolymerization process, they may also experience visbreaking, free radical generation, and graft copolymerization along with molecules of high and low performance elastomer. If the one or more other polymers are already compatible with the high or low performance elastomer, they may alternatively be added after completion of the graft copolymerization.

The elastomeric composition of the invention can also be combined with a particulate filler, whereupon the elastomeric composition can be formed into a film, and stretch-thinned to form a breathable microporous film which is permeable to water vapor and substantially impermeable to liquid water. The term "breathable" refers to a material having a water vapor transmission rate (WVTR) of at least about 1200 grams/m²-24 hours, suitably at least about 2000 grams/m²-24 hours, suitably at least about 3000 grams/m²-24 hours using the WVTR test described herein. When used, the particulate filler may constitute about 25-75% by weight of the elastomeric composition, suitably about 35-65% by weight. To form the breathable film, the filled elastomeric composition is formed into a film which is then oriented in at least one direction to about 2-7 times its initial dimension in that direction, and is then relaxed. The stretching causes voids to form around the filler particles. The voids are surrounded by thin polymer membranes which create a tortuous path from one side of the film to the other.

Generally, the filler particles have mean particle sizes of about 0.5-8 microns, suitably about 1-2 microns. Suitable fillers include calcium carbonate ($CaCO_3$), various kinds of clay, silica ($SiO_2$), alumina, barium sulfate, sodium carbonate, talc, magnesium sulfate, titanium dioxide, zeolites, aluminum sulfate, cellulose-type powders, diatomaceous earth, calcium oxide, magnesium oxide, aluminum hydroxide and the like. The filler particles are suitably inorganic, but may alternatively be organic. Organic fillers include cellulose, cyclodextrins, and cage molecules (e.g., polyhedral oligomeric silsesquioxane nanostretched chemicals).

The elastomeric polymer composition of the invention can be used to form a wide variety of articles including films, strands, fibers, and fabrics such as spunbond nonwoven webs, meltblown nonwoven webs, and other woven and nonwoven materials for which elastomeric performance and reduced cost are important or desired.

The elastomeric composition of the invention may be used to form films for use in a variety of applications, including without limitation personal care absorbent articles, medical absorbent articles, medical garments, drapes, caps, sterilization wraps, and the like. When the elastomeric film includes a particulate filler as described above, and is stretched, the film can be made breathable to water vapor. The elastomeric film can be laminated to a fabric, such as an elastic or inelastic nonwoven web, to form a film/nonwoven laminate. The laminate may be a stretch-bonded laminate (formed while the film is in the stretched state and the nonwoven web is relaxed), a neck-bonded laminate (formed while the nonwoven web is neck-stretched and the film is relaxed), or a neck stretch bonded laminate (formed while the film is in a stretched state and the nonwoven web is neck-stretched in the same direction as the film). The layers of the laminate can be bonded together thermally, ultrasonically, or using an adhesive.

The elastomeric film and/or film/nonwoven laminate can be used in personal care absorbent articles, which typically include a liquid permeable bodyside liner, a liquid impermeable (suitable water vapor breathable) outer cover, and an absorbent core between them. The elastomeric film may be apertured and used as a bodyside liner. The elastomeric film/nonwoven laminate, especially the breathable laminate, can be used as the outer cover. Examples of personal care absorbent articles include without limitation diapers, training pants, adult incontinence articles, feminine hygiene articles, and the like.

The elastomeric composition of the invention can be used to form a fibrous nonwoven web or other fabric, in which the fibers themselves are composed of the elastomeric composition. Such fabrics are inherently elastic. The elastomeric fabrics thus formed can be joined to an elastic or inelastic film to form a fabric laminate. Again, the elastomeric fabrics and laminates may be used in a wide variety of personal care articles and medical articles as indicated above.

TEST PROCEDURES

Test For Measuring Hysteresis

The hysteresis of a film sample is determined using a Sintech 1/S or 2/S apparatus equipped with TESTWORKS software to record data. The elastomeric composition is formed into a film having a thickness of about 25 microns. The film is cut into strips, each having a width of three inches and a length of six inches. Both ends of the film strip are clamped into the opposing jaws of the apparatus, so that one inch of the length on each end of the film is maintained within the jaws and four inches of the length are available for stretching.

Each film strip is stretched at a rate of 500 mm/min by 100% (increasing the exposed length from 4 to 8 inches) and the area under the curve (representing force X displacement) is measured and recorded as the "loading energy." The film strip is then allowed to recover to a length where the stretching force is zero. During retraction, the area under the curve is again measured and recorded. This is the "unloading energy."

Hysteresis is determined according to the following equation:

$$\% \text{ Hysteresis} = \frac{\text{loading energy minus unloading energy}}{\text{loading energy}} \times 100\%$$

Procedure For Measuring Gibb's Free Energy Of Mixing

The Gibb's free energy of mixing can be measured or calculated according to procedures known in the art. One known procedure involves use of the Flory-Huggins Theory. This procedure is described in Rosen, *Fundamental Principles Of Polymeric Materials*, Second Edition, John Wiley & Sons, Inc. (1993), at pages 85-94, and is incorporated herein by reference.

Procedure For Determining Load Loss (% LL) And Slope

The load loss (% LL) and slope are determined using a stress relaxation experiment with a one-inch wide by seven-inch long film strip. The ends of the film strip are clamped into a Sintech 1/S or 2/S frame equipped with TESTWORKS software to record data. Two inches of the film strip length are maintained within the clamping jaws on both ends, and three inches of the length are exposed.

The testing apparatus is maintained in a 100° F. controlled temperature chamber. The film strip is stretched at a rate of 40 inches per minute to an elongation of 50%, and is maintained in the stretched condition for twelve hours. The load as a function of time is measured and plotted, typically yielding a curve which shows exponential load loss.

The load loss (% LL) over time (t) is determined from the following equation:

$$\% \ LL = \frac{\text{Load } (t = 0) \text{ minus Load } (t = 12 \text{ hours})}{\text{Load } (t = 0)} \times 100\%$$

where $t$ = time, hours

The slope, which is constant over the time period, is determined from a plot of log (load) versus log (time), or from the following equation:

$$m = \frac{-\log[L(t)/L(0)]}{\log t}$$

where $m$ = slope, $L(t)$ = load at a given time ($t$), $L(0)$ = starting load at $t$ = 0, and $t$ = time Once the load loss and slope have been determined, the load L at any given time T can be determined from the following equation:

$$L(t) = L(0)t^{-m}$$

where m=magnitude (absolute value) of slope of line, t=time,

L(t)=load at a given time, and
L(0)=starting load at t=0

Water Vapor Transmission Rate (WVTR)/Breathability:

A suitable technique for determining the WVTR (water vapor transmission rate) value of a film or laminate material of the invention is the test procedure standardized by INDA (Association of the Nonwoven Fabrics Industry), number IST-70.4-99, entitled "STANDARD TEST METHOD FOR WATER VAPOR TRANSMISSION RATE THROUGH NONWOVEN AND PLASTIC FILM USING A GUARD FILM AND VAPOR PRESSURE SENSOR" which is incorporated by reference herein. The INDA procedure provides for the determination of WVTR, the permeance of the film to water vapor and, for homogeneous materials, water vapor permeability coefficient.

The INDA test method is well known and will not be set forth in detail herein. However, the test procedure is summarized as follows. A dry chamber is separated from a wet chamber of known temperature and humidity by a permanent guard film and the sample material to be tested. The purpose of the guard film is to define a definite air gap and to quiet or still the air in the air gap while the air gap is characterized. The dry chamber, guard film, and the wet chamber make up a diffusion cell in which the test film is sealed. The sample holder is known as the Permatran-W Model 100K manufactured by Mocon, Inc., Minneapolis, Minn. A first test is made of the WVTR of the guard film and the air gap between an evaporator assembly that generates 100% relative humidity. Water vapor diffuses through the air gap and the guard film and then mixes with a dry gas flow which is proportional to water vapor concentration. The electrical signal is routed to a computer for processing. The computer calculates the transmission rate of the air gap and the guard film and stores the value for further use.

The transmission rate of the guard film and air gap is stored in the computer as CalC. The sample material is then sealed in the test cell. Again, water vapor diffuses through the air gap to the guard film and the test material and then mixes with a dry gas flow that sweeps the test material. Also, again, this mixture is carried to the vapor sensor. This information is used to calculate the transmission rate at which moisture is transmitted through the test material according to the equation:

$$TR^{-1}_{test\ material} = TR^{-1}_{test\ material,\ guardfilm,\ airgap} - TR^{-1}_{guardfilm,\ airgap}$$

Calculations:
WVTR: The calculation of the WVTR uses the formula:

$$WVTR = F p_{sat}(T) RH / (A p_{sat}(T)(1-RH))$$

where:
F=The flow of water vapor in cc/min.,
$P_{sat}(T)$=The density of water in saturated air at temperature T,
RH=The relative humidity at specified locations in the cell,
A=The cross sectional area of the cell, and,
$P_{sat}(T)$=The saturation vapor pressure of water vapor at temperature T.

For the purposes of this Application, the testing temperature for the above test is about 37.8° C., the flow is 100 cc/min, and the relative humidity is 60%. Additionally, the value for n is 6 and the number of cycles is 3.

EXAMPLES

Samples of the elastomeric composition of the invention were prepared using a high torque co-rotating twin screw extruder manufactured by Berstorff under the name PT-25, having a screw diameter of 25 mm and length to diameter ratio of 26. The samples produced included KRATON 1652 (high performance elastomer) from Kraton Polymers LLC, and AFFINITY EG8200 (low performance elastomer) from Dow Chemical Company, in weight ratios of 70/30, 50/50, and 30/70. The twin screw extruder included three heating/cooling barrel zones along its length.

For each of the experimental samples, the first (polymer feed) barrel zone was maintained at a temperature of 170-190° C. to facilitate initial melting of the polymers. The first barrel zone was equipped with conveying elements for conveying the polymers forward.

The temperature in the second barrel zone was varied between "full cooling" (substantially below 100° C.) and 215° C. as shown in the table below. The second barrel zone was equipped with high shearing "kneading" elements and reverse conveying "seal" elements to facilitate increased pressure, shearing, and visbreaking of some of the high performance elastomer and low performance elastomer molecules.

The temperature in the third barrel zone, approaching the die, was maintained at about 210° C. The third barrel zone was equipped with forward conveying elements intended to build sufficient pressure behind the die, to facilitate extrusion through the die.

Table 1 indicates the results of the experiments. In each case, a dry blend of the two elastomers was used as a control. Visbreaking and grafting of some of the elastomer molecules is suggested by a change in melt flow rate (in either direction) of the inventive samples versus the control. Changes in glass transition temperature also suggest a chemical reaction, with a higher glass transition temperature suggesting improved mixing, attraction and compatibility between the molecules. A lower percent load loss (% LL) and a less negative (more horizontal) slope indicate improved elastomeric performance.

Table 1 provides a representative summary of work that has been done.

TABLE 1

| Example | Process | % KRATON G1652 | % AFFINITY EG8200 | Zone 2 Temp. ° C. | Feed Rate lbs/hr. | RPM | MFR 5 kg, 200° C. | Tg ° C. | % LL | Slope |
|---|---|---|---|---|---|---|---|---|---|---|
| 1 | Dry Blend | 70 | 30 | — | — | — | 4.2 | N.A. | N.A. | N.A. |
| 2 | Shear Pulverize | 70 | 30 | Full Cool | 2.5 | 300 | 2.3 | −43 | N.A. | N.A. |
| 3 | Shear Pulverize | 70 | 30 | 93 | 3.5 | 300 | 2.6 | −56 | 53 | −0.15 |
| 4 | Shear Pulverize | 70 | 30 | 93 | 3.5 | 300 | 2.6 | −68 | 45 | −0.07 |
| 5 | Dry Blend | 50 | 50 | — | — | — | 5.1 | N.A. | N.A. | N.A. |

TABLE 1-continued

| Example | Process | % KRATON G1652 | % AFFINITY EG8200 | Zone 2 Temp. °C. | Feed Rate lbs/hr. | RPM | MFR 5 kg, 200° C. | Tg °C. | % LL | Slope |
|---|---|---|---|---|---|---|---|---|---|---|
| 6 | Shear Pulverize | 50 | 50 | Full Cool | 3.5 | 300 | 5.8 | N.A. | N.A. | N.A. |
| 7 | Shear Pulverize | 50 | 50 | 93 | 3.5 | 300 | 5.5 | N.A. | N.A. | N.A. |
| 8 | Dry Blend | 30 | 70 | — | — | — | 9.4 | −56 | 48 | −0.07 |
| 9 | Shear Pulverize | 30 | 70 | Full Cool | 1.2 | 300 | 9.1 | −56 | N.A. | N.A. |
| 10 | Shear Pulverize | 30 | 70 | 93 | 0.1 | 300 | 12.5 | −60 | N.A. | N.A. |
| 11 | Shear Pulverize | 30 | 70 | Full Cool | 1.2 | 300 | 10.4 | −68 | 45 | −0.07 |
| 12 | Shear Pulverize | 30 | 70 | 93 | 0.1 | 300 | 11.1 | −44 | 54 | −0.11 |
| 13 | Shear Pulverize | 30 | 70 | 93 | 0.1 | 300 | 10.6 | −58 | 58 | −0.09 |
| 14 | Shear Pulverize | 30 | 70 | 93 | 0.5 | 420 | 9.8 | −56 | 52 | −0.07 |
| 15 | Shear Pulverize | 30 | 70 | 93 | 1.0 | 420 | 12.7 | −50 | 59 | −0.08 |
| 16 | Shear Pulverize | 30 | 70 | 93 | 1.0 | 420 | 8.5 | −46 | N.A. | N.A. |
| 17 | Shear Pulverize | 30 | 70 | 93 | 1.0 | 420 | 11.5 | −37 | N.A. | N.A. |
| 18 | Shear Pulverize | 30 | 70 | 93 | 2.5 | 420 | 8.7 | −40 | N.A. | N.A. |
| 19 | Shear Pulverize | 30 | 70 | 215 | 0.5 | 300 | 5.3 | −36 | 48 | −0.08 |
| 20 | Shear Pulverize | 30 | 70 | 215 | 0.5 | 300 | 9.7 | −37 | 49 | −0.08 |
| 21 | None | 100 | 0 | | | | 1.0 | | 52 | −0.08 |
| 22 | None | 0 | 100 | | | | 20.1 | | 65 | −0.12 |

*N.A. = Not Available

FIG. 1 is a log-log plot of stress relaxation modulus (psi) versus time seconds) for the elastomer samples described in Examples 8, 13-15 and 19-22. As illustrated in FIG. 1, the slope of the line is linear (i.e. constant) for each of the samples.

While the embodiments of the invention described herein are presently preferred, various modifications and improvements can be made without departing from the spirit and scope of the invention. The scope of the invention is indicated by the appended claims, and all changes that fall within the meaning and range of equivalents are intended to be embraced therein.

We claim:

1. An elastomeric composition, comprising a mixture of:
   about 20-80% by weight of a high performance elastomer;
   about 20-80% by weight of a low performance elastomer; and
   about 1-10% by weight of a graft copolymer of the high and low performance elastomers;
   wherein the graft copolymer is selected from the group consisting of a) block copolymers in which a block of the high performance elastomer is chemically attached to a backbone molecule of the low performance elastomer, b) block copolymers in which a block of the low performance elastomer is chemically attached to a backbone molecule of the high performance elastomer, and c) combinations thereof; and
   the graft copolymer is formed during solid state shear pulverization of the high and low performance elastomers at a temperature below the melting or softening temperatures of both elastomers.

2. The elastomeric composition of claim 1, comprising about 30-70% by weight of the high performance elastomer, about 30-70% by weight of the low performance elastomer, and about 1.0-5.0% by weight of the copolymer of high and low performance elastomers.

3. The elastomeric composition of claim 1, wherein the high performance elastomer comprises a styrene-diene block copolymer.

4. The elastomeric composition of claim 1, wherein the high performance elastomer comprises a styrene-olefin block copolymer.

5. The elastomeric composition of claim 4, wherein the styrene-olefin block copolymer comprises a selectively hydrogenated styrene-diene block copolymer.

6. The elastomeric composition of claim 1, wherein the low performance elastomer comprises a single-site catalyzed ethylene-alpha olefin copolymer having a density of about 0.910 grams/cm$^3$ or less.

7. The elastomeric composition of claim 1, wherein the single site catalyzed ethylene-alpha olefin copolymer has a density of about 0.860-0.900 grams/cm$^3$.

8. A film comprising the elastomeric composition of claim 1.

9. A fabric comprising the elastomeric composition of claim 1.

10. A film comprising a layer formed of an elastomeric composition, the elastomeric composition comprising a mixture of:
    about 20-80% by weight of a high performance elastomer;
    about 20-80% by weight of a low performance elastomer; and
    about 1-10% by weight of a graft copolymer of the high and low performance elastomers;
    wherein the graft copolymer is selected from the group consisting of a) block copolymers in which a block of the high performance elastomer is chemically attached to a backbone molecule of the low performance elastomer, b) block copolymers in which a block of the low performance elastomer is chemically attached to a backbone molecule of the high performance elastomer, and c) combinations thereof; and
    the graft copolymer is formed during solid state shear pulverization of the high and low performance elastomers at a temperature below the melting or softening temperatures of both elastomers.

11. The film of claim 10, wherein the elastomeric composition comprises about 30-70% by weight of the high performance elastomer and about 30-70% by weight of the low performance elastomer.

12. The film of claim 10, wherein the elastomeric composition comprises about 1.0-5.0% by weight of the graft copolymer.

13. The film of claim 10, wherein the high performance elastomer exhibits a hysteresis of 20% or less.

14. The film of claim 10, wherein the high performance elastomer exhibits a hysteresis of 15% or less.

15. The film of claim 10, wherein the high performance elastomer exhibits a hysteresis of 10% or less.

16. The film of claim 10, wherein the low performance elastomer exhibits a hysteresis of 40% or more.

17. The film of claim 10, wherein the low performance elastomer exhibits a hysteresis of 50-75%.

18. The film of claim 10, wherein the layer further comprises a filler.

19. A laminate including the film of claim 10 and a nonwoven web.

20. A fabric comprising at least one layer formed of an elastomeric composition, the elastomeric composition comprising a mixture of:
   about 20-80% by weight of a high performance elastomer;
   about 20-80% by weight of a low performance elastomer; and
   about 1-10% by weight of a graft copolymer of the high and low performance elastomers;
   wherein the graft copolymer is selected from the group consisting of a) block copolymers in which a block of the high performance elastomer is chemically attached to a backbone molecule of the low performance elastomer, b) block copolymers in which a block of the low performance elastomer is chemically attached to a backbone molecule of the high performance elastomer, and c) combinations thereof; and
   the graft copolymer is formed during solid state shear pulverization of the high and low performance elastomers at a temperature below the melting or softening temperatures of both elastomers.

21. The fabric of claim 20, wherein the at least one layer comprises a plurality of fibers.

22. The fabric of claim 21, wherein the at least one layer comprises a nonwoven web.

23. The fabric of claim 21, further comprising a film layer.

24. The fabric of claim 21, wherein the at least one layer comprises a film, and the fabric further comprises a fibrous layer.

25. The fabric of claim 24, wherein the fibrous layer comprises a nonwoven web.

26. An elastomeric composition, comprising a mixture of:
   about 20-80% by weight of a high performance elastomer;
   about 20-80% by weight of a low performance elastomer; and
   about 1-10% by weight of a graft copolymer of the high and low performance elastomers;
   wherein the composition is prepared by combining a masterbatch including a relatively higher concentration of the copolymer, with an additional amount of high performance elastomer, low performance elastomer, or high and low performance elastomers;
   the graft copolymer is selected from the group consisting of a) block copolymers in which a block of the high performance elastomer is chemically attached to a backbone molecule of the low performance elastomer, b) block copolymers in which a block of the low performance elastomer is chemically attached to a backbone molecule of the high performance elastomer, and c) combinations thereof; and
   the graft copolymer is formed during solid state shear pulverization of the high and low performance elastomers at a temperature below the melting or softening temperatures of both elastomers.

27. A personal care absorbent article comprising a liquid permeable bodyside liner, a liquid-impermeable outer cover, and an absorbent core between them, wherein at least one of the bodyside liner and outer cover comprises the film of claim 10.

28. A personal care absorbent article comprising a liquid permeable bodyside liner, a liquid-impermeable outer cover, and an absorbent core between them, wherein at least one of the bodyside liner and outer cover comprises the fabric of claim 20.

29. A medical article comprising the film of claim 10.

30. A medical article comprising the fabric of claim 20.

* * * * *